(12) United States Patent
Raskin et al.

(10) Patent No.: US 11,151,188 B2
(45) Date of Patent: *Oct. 19, 2021

(54) AUTOMATED LECTURE DECONSTRUCTION

(71) Applicant: Chegg, Inc., Santa Clara, CA (US)

(72) Inventors: Oliver Raskin, Santa Clara, CA (US); Colin Murphy, Santa Clara, CA (US); Vincent Le Chevalier, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 16/172,301

(22) Filed: Oct. 26, 2018

(65) Prior Publication Data

US 2019/0065515 A1 Feb. 28, 2019

Related U.S. Application Data

(63) Continuation of application No. 14/524,350, filed on Oct. 27, 2014, now Pat. No. 10,140,379.

(51) Int. Cl.
*G06F 16/438* (2019.01)
*G09B 5/06* (2006.01)
(Continued)

(52) U.S. Cl.
CPC ...... *G06F 16/4387* (2019.01); *G06F 3/04842* (2013.01); *G06F 16/958* (2019.01); *G06Q 10/02* (2013.01); *G06Q 10/06* (2013.01); *G06Q 10/067* (2013.01); *G06Q 10/0633* (2013.01); *G06Q 10/087* (2013.01); *G06Q 10/0833* (2013.01); *G06Q 10/10* (2013.01); *G06Q 10/101* (2013.01); *G06Q 10/103* (2013.01);
(Continued)

(58) Field of Classification Search
CPC .............................. G06F 16/4387; G09B 7/00
See application file for complete search history.

(56) References Cited

U.S. PATENT DOCUMENTS 5,812,642 A 9/1998 Leroy
6,295,092 B1 9/2001 Hullinger et al.
(Continued)

FOREIGN PATENT DOCUMENTS

JP 2006155384 A 6/2006
KR 20070004153 A 1/2007

OTHER PUBLICATIONS

"BubblePLY," PLYmedia Inc. 2008, 1 page, [online] [Retrieved on Apr. 20, 2009] Retrieved from the internetURL: http://www.plymedia.com/products/bubbleply/bubbleply.aspx>.
(Continued)

*Primary Examiner* — Nathan Hillery
(74) *Attorney, Agent, or Firm* — Kavita Aggarwal

(57) ABSTRACT

An online platform generates a playlist of clips of a lecture accessed by a plurality of users of the online platform. The online platform receives a recording of the lecture, and receives a plurality of events captured during a time period corresponding to the lecture. Each captured event is associated with a time stamp corresponding to a time at which a user performed an activity while listening to the lecture. The online platform clusters the captured events based on the time stamps, and generates one or more clips of the recording of the lecture from the clustered events. The online platform generates a playlist including the clips of the lecture.

20 Claims, 9 Drawing Sheets

(51) Int. Cl.

| | |
|---|---|
| *G09B 7/00* | (2006.01) |
| *G06F 3/0484* | (2013.01) |
| *G06Q 10/02* | (2012.01) |
| *G06Q 10/06* | (2012.01) |
| *G06Q 10/08* | (2012.01) |
| *G06Q 20/12* | (2012.01) |
| *G06Q 10/10* | (2012.01) |
| *G06Q 20/14* | (2012.01) |
| *G06Q 30/02* | (2012.01) |
| *G06Q 20/22* | (2012.01) |
| *G06Q 30/06* | (2012.01) |
| *G06Q 30/08* | (2012.01) |
| *G06Q 40/04* | (2012.01) |
| *G06Q 40/00* | (2012.01) |
| *G06Q 50/18* | (2012.01) |
| *G06Q 50/16* | (2012.01) |
| *G06Q 50/00* | (2012.01) |
| *G09B 5/02* | (2006.01) |
| *G06Q 50/22* | (2018.01) |
| *G09B 29/00* | (2006.01) |
| *G09B 19/00* | (2006.01) |
| *G09B 23/00* | (2006.01) |
| *H04W 4/08* | (2009.01) |
| *H04W 4/14* | (2009.01) |
| *H04W 4/02* | (2018.01) |
| *H04W 4/021* | (2018.01) |
| *H04W 40/02* | (2009.01) |
| *H04W 40/20* | (2009.01) |
| *H04W 48/16* | (2009.01) |
| *H04W 48/10* | (2009.01) |
| *H04W 12/06* | (2021.01) |
| *H04W 52/02* | (2009.01) |
| *H04W 64/00* | (2009.01) |
| *H04W 72/04* | (2009.01) |
| *H04W 72/00* | (2009.01) |
| *H04W 80/06* | (2009.01) |
| *H04W 72/12* | (2009.01) |
| *H04W 84/12* | (2009.01) |
| *H04W 8/22* | (2009.01) |
| *H04W 8/00* | (2009.01) |
| *H04W 8/18* | (2009.01) |
| *H04W 88/18* | (2009.01) |
| *H04W 92/18* | (2009.01) |
| *G06F 16/958* | (2019.01) |

(52) U.S. Cl.
CPC ......... *G06Q 20/1235* (2013.01); *G06Q 20/14* (2013.01); *G06Q 20/29* (2013.01); *G06Q 30/02* (2013.01); *G06Q 30/0201* (2013.01); *G06Q 30/0225* (2013.01); *G06Q 30/0229* (2013.01); *G06Q 30/0242* (2013.01); *G06Q 30/0256* (2013.01); *G06Q 30/0261* (2013.01); *G06Q 30/0276* (2013.01); *G06Q 30/0277* (2013.01); *G06Q 30/0601* (2013.01); *G06Q 30/0605* (2013.01); *G06Q 30/0611* (2013.01); *G06Q 30/0613* (2013.01); *G06Q 30/0621* (2013.01); *G06Q 30/0625* (2013.01); *G06Q 30/0629* (2013.01); *G06Q 30/0633* (2013.01); *G06Q 30/0641* (2013.01); *G06Q 30/0643* (2013.01); *G06Q 30/08* (2013.01); *G06Q 40/04* (2013.01); *G06Q 40/12* (2013.12); *G06Q 50/01* (2013.01); *G06Q 50/16* (2013.01); *G06Q 50/18* (2013.01); *G06Q 50/182* (2013.01); *G06Q 50/184* (2013.01); *G06Q 50/22* (2013.01); *G09B 5/02* (2013.01); *G09B 5/06* (2013.01); *G09B 7/00* (2013.01); *G09B 19/00* (2013.01); *G09B 23/00* (2013.01); *G09B 29/007* (2013.01); *H04W 4/02* (2013.01); *H04W 4/021* (2013.01); *H04W 4/025* (2013.01); *H04W 4/08* (2013.01); *H04W 4/14* (2013.01); *H04W 8/005* (2013.01); *H04W 8/18* (2013.01); *H04W 8/22* (2013.01); *H04W 12/06* (2013.01); *H04W 40/02* (2013.01); *H04W 40/20* (2013.01); *H04W 48/10* (2013.01); *H04W 48/16* (2013.01); *H04W 52/0219* (2013.01); *H04W 52/0251* (2013.01); *H04W 52/0264* (2013.01); *H04W 52/0296* (2013.01); *H04W 64/00* (2013.01); *H04W 72/005* (2013.01); *H04W 72/0473* (2013.01); *H04W 72/12* (2013.01); *H04W 80/06* (2013.01); *H04W 84/12* (2013.01); *H04W 88/182* (2013.01); *H04W 92/18* (2013.01); *G06Q 2220/10* (2013.01); *Y02D 30/70* (2020.08); *Y10S 707/922* (2013.01)

(56) References Cited

U.S. PATENT DOCUMENTS

| | | |
|---|---|---|
| 6,789,228 B1 | 9/2004 | Merril et al. |
| 6,956,593 B1 | 10/2005 | Gupta et al. |
| 6,993,347 B2 | 1/2006 | Bodin et al. |
| 7,032,178 B1 | 4/2006 | McKnight et al. |
| 7,055,168 B1 | 5/2006 | Errico et al. |
| 7,137,062 B2 | 11/2006 | Kaufinan et al. |
| 7,149,755 B2 | 12/2006 | Obrador |
| 7,254,605 B1 | 8/2007 | Strum |
| 7,559,017 B2 | 7/2009 | Datar et al. |
| 7,599,950 B2 | 10/2009 | Walther et al. |
| 7,616,816 B2 | 11/2009 | Cheng |
| 7,636,883 B2 | 12/2009 | Albornoz et al. |
| 7,761,436 B2 | 7/2010 | Norton et al. |
| 8,214,264 B2 | 7/2012 | Kasavin et al. |
| 9,164,590 B2 | 10/2015 | Patel et al. |
| 9,330,427 B2 | 5/2016 | Conwell |
| 9,679,492 B2 | 6/2017 | Sri et al. |
| 2001/0023436 A1 | 9/2001 | Srinivasan et al. |
| 2002/0059218 A1 | 5/2002 | August et al. |
| 2002/0059584 A1 | 5/2002 | Ferman et al. |
| 2002/0065678 A1 | 5/2002 | Peliotis et al. |
| 2002/0069218 A1 | 6/2002 | Sull et al. |
| 2002/0120925 A1 | 8/2002 | Logan |
| 2003/0065655 A1 | 4/2003 | Syeda-Mahmood |
| 2003/0068046 A1 | 4/2003 | Lindqvist et al. |
| 2003/0093790 A1 | 5/2003 | Logan et al. |
| 2003/0107592 A1 | 6/2003 | Li et al. |
| 2003/0112276 A1 | 6/2003 | Lau et al. |
| 2003/0196164 A1 | 10/2003 | Gupta et al. |
| 2003/0231198 A1 | 12/2003 | Janevski |
| 2004/0021685 A1 | 2/2004 | Denoue et al. |
| 2004/0125133 A1 | 7/2004 | Pea et al. |
| 2004/0138946 A1 | 7/2004 | Stolze |
| 2004/0168118 A1 | 8/2004 | Wong et al. |
| 2004/0205482 A1 | 10/2004 | Basu et al. |
| 2005/0044254 A1 | 2/2005 | Smith |
| 2005/0081159 A1 | 4/2005 | Gupta et al. |
| 2005/0203876 A1 | 9/2005 | Dragun et al. |
| 2005/0203892 A1 | 9/2005 | Wesley et al. |
| 2006/0041564 A1 | 2/2006 | Jain et al. |
| 2006/0053365 A1 | 3/2006 | Hollander et al. |
| 2006/0087987 A1 | 4/2006 | Witt et al. |
| 2007/0002946 A1 | 1/2007 | Bouton et al. |
| 2007/0094076 A1 | 4/2007 | Perkowski et al. |
| 2007/0162568 A1 | 7/2007 | Gupta et al. |
| 2007/0250901 A1 | 10/2007 | McIntire et al. |
| 2008/0005064 A1 | 1/2008 | Sarukkai |
| 2008/0028294 A1 | 1/2008 | Sell et al. |
| 2008/0086742 A1 | 4/2008 | Aldrey et al. |
| 2008/0091723 A1 | 4/2008 | Zuckerberg et al. |

(56) References Cited

U.S. PATENT DOCUMENTS

| | | |
|---|---|---|
| 2008/0250331 A1 | 10/2008 | Tulshibagwale |
| 2009/0199251 A1 | 8/2009 | Badoiu et al. |
| 2009/0204882 A1 | 8/2009 | Hollander et al. |
| 2009/0210779 A1 | 8/2009 | Badoiu et al. |
| 2009/0249185 A1 | 10/2009 | Datar et al. |
| 2009/0271283 A1 | 10/2009 | Fosnacht et al. |
| 2009/0297118 A1 | 12/2009 | Fink et al. |
| 2009/0300475 A1 | 12/2009 | Fink et al. |
| 2010/0030578 A1 | 2/2010 | Siddique et al. |
| 2010/0169927 A1 | 7/2010 | Yamaoka et al. |
| 2011/0202400 A1 | 8/2011 | Bedard et al. |
| 2011/0225417 A1 | 9/2011 | Maharajh et al. |
| 2013/0031162 A1 | 1/2013 | Willis et al. |
| 2013/0110565 A1 | 5/2013 | Means, Jr. et al. |
| 2015/0056596 A1 | 2/2015 | Bercovitz et al. |
| 2015/0086172 A1 | 3/2015 | Pajouh |
| 2015/0120593 A1 | 4/2015 | Madhavan et al. |
| 2015/0127340 A1 | 5/2015 | Epshteyn et al. |
| 2015/0149378 A1 | 5/2015 | Chevalier et al. |
| 2016/0117339 A1 | 4/2016 | Raskin et al. |

OTHER PUBLICATIONS

"More on Mojiti," bavatuesdays.com, Mar. 23, 2007, 2 pages, [online] [Retrieved on Jun. 19, 2017] Retrievedfrom the internet.

"New commenting and stats features," Google Video Blog, Nov. 14, 2006, 5 pages [online] [Retrieved on Jul. 18, 2008] Retrieved from the internet.

"New Feature: Link within a Video," Google Video Blog, Jul. 19, 2006, 1 page [online] [Retrieved on Jul. 18, 2008] Retrieved from the intern et.

"Online Media Bookmark Manager," Media X, Date Unknown, 2 Pages [online] [Retrieved on Jul. 18, 2008]Retrieved from the intern et.

"Ooyala-Interactive Video Advertising," Ooyala, Inc. 2009, 1 page, [online] [Retrieved on Apr. 20, 2009]Retrieved from the internet.

"Ticket #3504 (new enhancement)," Participatory Culture Foundation, Software Development, Aug. 14, 2006,1 page, [online] [retrieved on Jan. 16, 2007] Retrieved from the Internet.

"Video Marketing, Video Editing & Hosting, Interactive Video," Veeple.com, 2009, 1 page, [online] [Retrievedon Apr. 20, 2009] Retrieved from internet.

Arman, F. et al., "Image Processing on Encoded Video Sequences," Multimedia Systems, 1994, pp. 211-219, vol. 1, No. 5.

Examiner's first report on Australian Patent Application No. AU 2010249316, dated Jun. 20, 2011, 3 Pages.

First Office Action dated Feb. 28, 2012 for Chinese Patent Application No. CN 200980108230.7,11 Pages.

Ford, RM. et al., "Metrics for Shot Boundary Detection in Digital Video Sequences," Multimedia Systems,Jan. 2000, pp. 37-46, vol. 8.

Gonzalez, N., "Video Ads: Every Startup Has a Different Solution," TechCrunch, Jul. 6, 2007, 23 Pages,[online] [Retrieved on Jun. 19, 2017] Retrieved from the internet.

Good, R., "Online Video Publishing Gets Into the Conversation: Click.TV," Robin Good, What CommunicationExperts Need to Know, Apr. 18, 2006, 1 O pages, [on line] [retrieved on Jan. 16, 2007] Retrieved from theInternet.

Korean Intellectual Property Office Notice of Preliminary Rejection, Korean Patent Application No. 10-2009-7015068, dated Feb. 5, 2010, 12 pages.

Korean Intellectual Property Office Notice of Preliminary Rejection, Korean Patent Application No. 10-2009-7015068, dated Oct. 5, 2009, 5 pages.

Mikolajczyk, K. et al., "A Performance Evaluation of Local Descriptors", IEEE Transactions on PatternAnalysis and Machine Intelligence, Oct. 2005, vol. 27, No. 10, pp. 1615-1630, 16 pages.

MirriAd, 2008, 1 page, [online] [Retrieved on Apr. 20, 2009] Retrieved from the internet.

Moenne-Loccoz, N., et al., "Managing Video Collections at Large," CUDB '04: Proceedings of the 1.sup.stInternational Workshop on Computer Vision Meets Database, Jun. 2004, pp. 59-66.

Maphade, M.R. et al., "A High-Performance Shot Boundary Detection Algorithm Using Multiple Cues," 1998International Conference on Image Processing, Oct. 4-7, 1998, pp. 884-887, vol. 1.

PCT International Search Report and Written Opinion, PCT/US2007/088067, dated Jul. 21, 2008, 13 pages.

PCT International Search Report and Written Opinion, PCT/US2009/033475, dated Aug. 20, 2009, 7 Pages.

PCT International Search Report and Written Opinion, PCT/US2009/034422, dated Oct. 6, 2009, 12 Pages.

PCT International Search Report and Written Opinion, PCT/US2009/042919, dated Jun. 17, 2009, 8 pages.

Screenshot of "Interactive Video Demo-Check out the Yelp/ AdSense demo," Ooyala, Inc. 2009, 1 page[online] [Retrieved on Apr. 23, 2009] Can be retrieved from the internet.

Screenshot of "Remixer", YouTube.com, May 2007 to Feb. 2008, 1 page.

Screenshot of Veeple Labs—Interactive Video, 1 page [online] [Retrieved on Jun. 9, 2008] Retrieved from theintern et.

Tjondronegoro, D., et al., "Content-Based Video Indexing for Sports Applications Using Integrated Multi-Modal Approach," Multimedia '05: Proceedings of the 13.sup.th Annual ACM International Conference onMultimedia, Nov. 2005, p. 1035-1036.

U.S. Appl. No. 12/266,476, filed Nov. 6, 2008, 45 Pages.

U.S. Appl. No. 12/414,553, filed Mar. 30, 2009, 41 Pages.

U.S. Appl. No. 60/756,787, filed Jan. 6, 2006, 19 pages.

U.S. Appl. No. 61/097,167, filed Sep. 15, 2008,49 Pages.

U.S. Appl. No. 12/411,162, filed Mar. 25, 2009, 38 Pages.

Zabih, R. et al., "A Feature-Based Algorithm for Detecting and Classifying Scene Breaks," Proc. ACMMultimedia 95, San Francisco, CA, Nov. 1993, pp. 189-200.

Zentation.com, 1 page [online] [Retrieved on Jun. 26, 2009] Retrieved from the internet.

AUTOMATED LECTURE DECONSTRUCTION

CROSS REFERENCE TO RELATED APPLICATIONS

Field of the Invention

This application is a continuation of application Ser. No. 14/524,350, which is incorporated by reference in its entirety.

BACKGROUND

Field of the Invention

This disclosure relates to generating a playlist of clips of a lecture based on user activities performed during the lecture.

Description of the Related Art

Students often share similar mental models, patterns, and behaviors when studying, regardless of the subject they are studying or the level at which they are studying. A primary challenge for students is filtering the content presented to them in order to focus on critical components. Many students adopt a process referred to as the "study funnel," which involves capturing content, strategizing, reducing the content, organizing it, practicing it, and assessing themselves. The capture stage typically includes taking lecture notes and reading textbooks or other course materials, in which the student takes an initial pass at filtering and/or tagging based on perceived importance of the concepts. During the strategizing stage, the student identifies content to study (e.g., to prepare for an upcoming examination). In the organizing stage, the student further reduces, summarizes, and categorizes content, for example by making a study guide or outline of the content selected in the strategizing stage. The practice stage involves reviewing the organized content, often focusing on memorizing a small subset of the content for which the student's understanding is weak. Finally, during the assessment stage, the student may engage in formal assessment to gauge the student's recall and retrieval of the content. The student may repeat stages in the study funnel, re-prioritizing the content or refocusing on challenging concepts.

Education platforms provide students with access to a wide range of collaborative tools and solutions that are rapidly changing the way courses are taught and delivered. As traditional courses are shifting from a static textbook-centric model to a connected one where related, personalized, and other social-based content activities are being aggregated dynamically within the core academic material, it becomes strategic for education publishing platforms to be able to address students' study habits at all stages of the study process. However, while current education platforms assist students in the later stages of the study process, existing platforms do not address all stages of the study funnel. In particular, existing education platforms do not adequately integrate students' processes for capturing and filtering information during lectures, and therefore do not provide an integrated study environment.

SUMMARY

An online system, such as an education platform, analyzes lectures to generate timelines of the lecture or to generate playlists of the lectures. The online system receives a plurality of events captured during a time period corresponding to the lecture. The events may be captured as users access the lecture through the education platform, or the events may be captured as users attend a live lecture. Each captured event is associated with a time stamp corresponding to a time at which a user performed an activity on the online platform while listening to the lecture, which may be any of a variety of passive, active, or recall activities.

The online system clusters the events based on the time stamps, and generates one or more clips of the lecture based on the clustered events. Each clip includes a portion of a recording of the lecture corresponding to time stamps associated with the clustered events. The online system generates a playlist including the clips of the lecture, enabling a user of the online system to easily access the portions of the lecture associated with clusters of events generated by users listening to the lecture.

In one embodiment, the online system additionally or alternatively extracts one or more key indicators from each of a plurality of the event clusters. For example, the online system extracts one or more key indicators from each cluster of events used to generate a clip of the lecture. A timeline of the lecture is generated to map the extracted key indicators to a time within the lecture.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments described herein provide for generating a timeline of key indicators of a lecture. One example online system analyzing lectures and generating lecture timelines is an education publishing platform configured for digital content interactive services distribution and consumption. In the platform, personalized learning services are paired with secured distribution and analytics systems for reporting on both connected user activities and effectiveness of deployed services. The education platform manages educational services through the organization, distribution, and analysis of electronic documents. Furthermore, while embodiments are described herein with respect to academic lectures, the online system may use similar methods to generate timelines of other types of lectures or speeches, including conference talks, political speeches, professional presentations, and the like.

Figure 1:
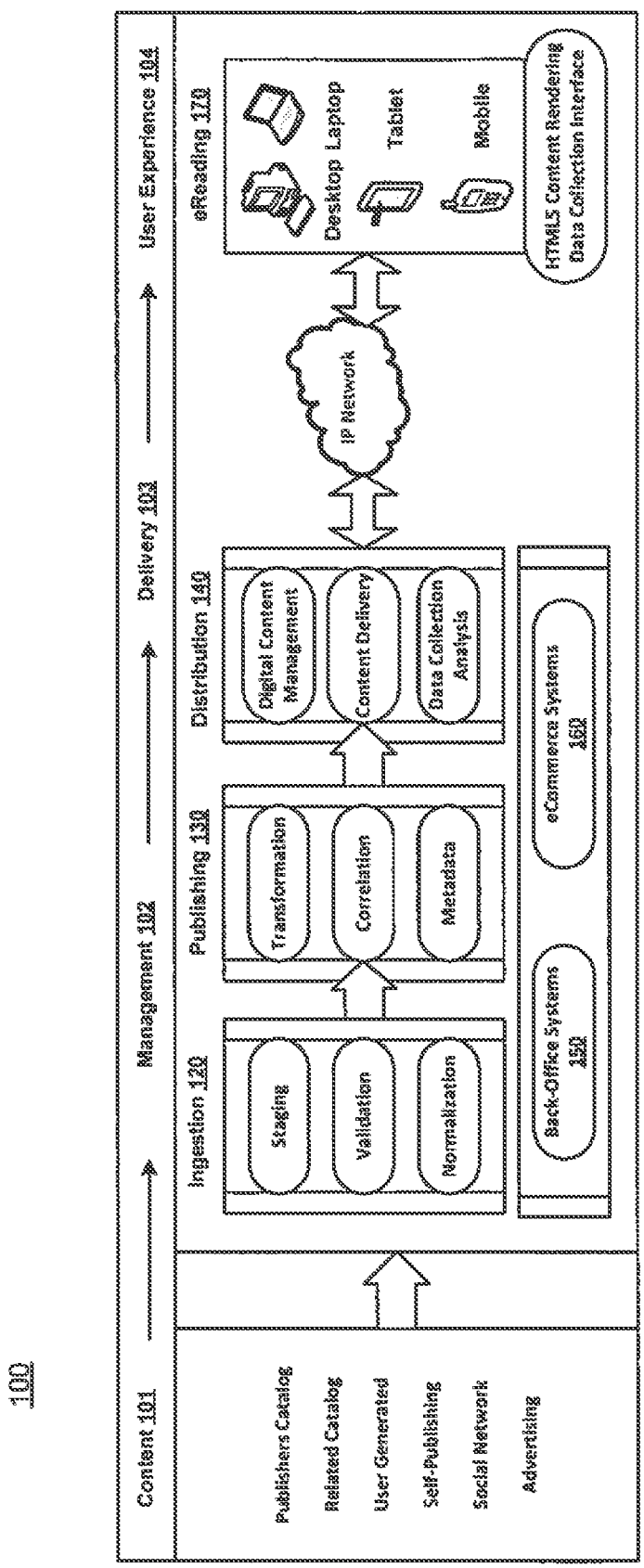
FIG. 1 illustrates an example education platform, according to one embodiment.

FIG. 1 is a high-level block diagram illustrating the education platform environment 100. The education platform environment 100 is organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book (such as a textbook), a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 3.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, textbook solutions, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading and other educational activities to be recorded by the platform, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Platform Content Processing and Distribution

Figure 2:
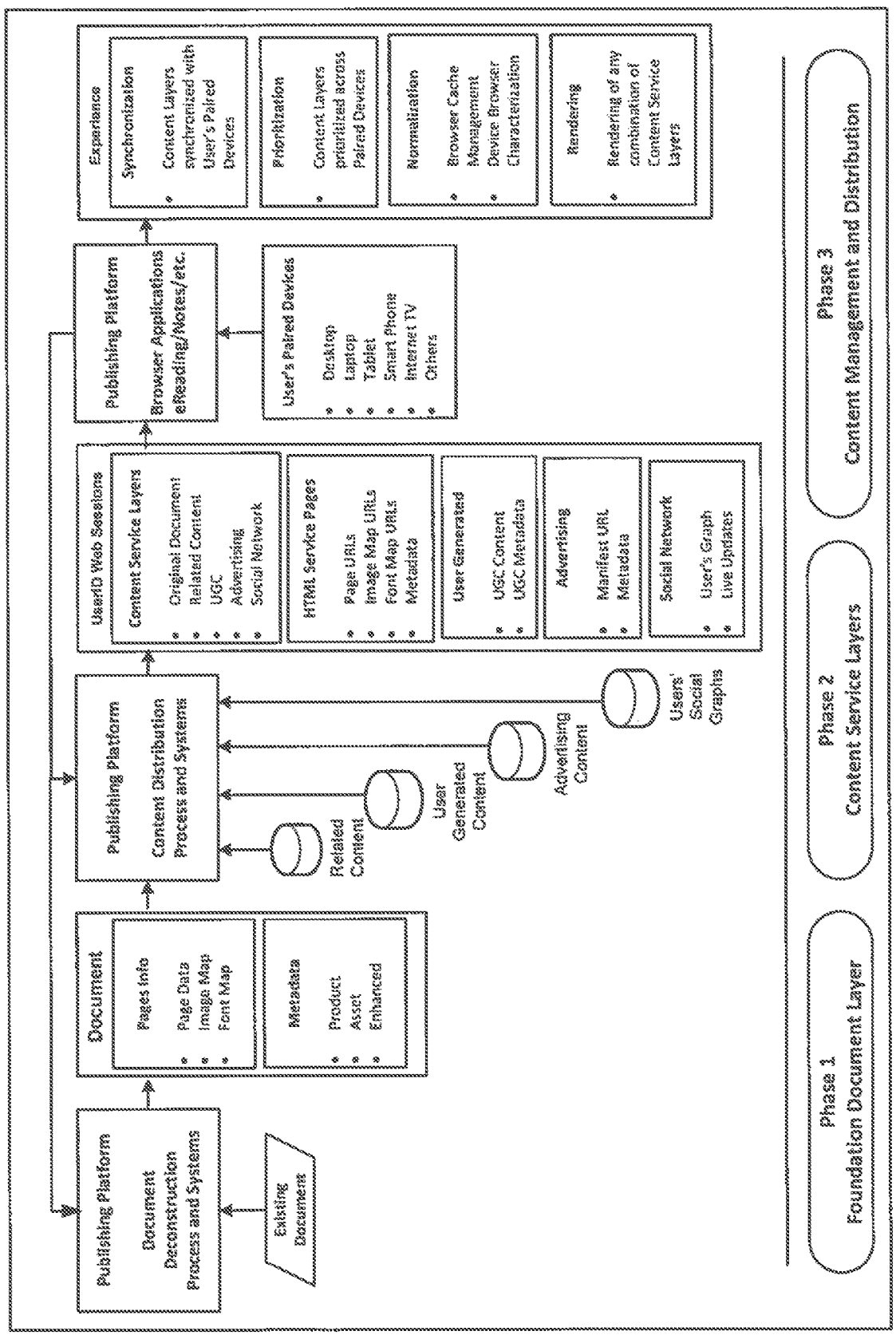
FIG. 2 is a block diagram illustrating interactions with an education platform, according to one embodiment.

The platform content catalog is a mosaic of multiple content sources which are collectively processed and assembled into the overall content service offering. The content catalog is based upon multilayered publications that are created from reconstructed foundation documents augmented by supplemental content material resulting from users' activities and platform back-end processes. FIG. 2 illustrates an example of a publishing platform where multilayered content document services are assembled and distributed to desktop, mobile, tablet, and other connected devices. As illustrated in FIG. 2, the process is typically segmented into three phases: Phase 1: creation of the foundation document layer; Phase 2: association of the content service layers to the foundation document layer; and Phase 3: management and distribution of the content.

During Phase 1, the licensed document is ingested into the publishing platform and automatically reconstructed into a series of basic elements, while maintaining page fidelity to the original document structure. Document reconstruction will be described in more detail below with reference to FIG. 3.

During Phase 2, once a foundation document has been reconstructed and its various elements extracted, the publishing platform runs several processes to enhance the reconstructed document and transform it into a personalized multilayered content experience. For instance, several distinct processes are run to identify the related content to the reconstructed document, user generated content created by registered users accessing the reconstructed document, advertising or merchandising material that can be identified by the platform and indexed within the foundation document and its layers, and social network content resulting from registered users' activities. By having each of these processes focusing on specific classes of content and databases, the elements referenced within each classes become identified by their respective content layer. Specifically, all the related content page-based elements that are matched with a particular reconstructed document are classified as part of the related content layer. Similarly, all other document enhancement processes, including user generated, advertising and social among others, are classified by their specific content layer. The outcome of Phase 2 is a series of static and dynamic page-based content layers that are logically stacked on top of each other and which collectively enhance the reconstructed foundation document.

During Phase 3, once the various content layers have been identified and processed, the resulting multilayered documents are then published to the platform content catalog and pushed to the content servers and distribution network for distribution. By having multilayered content services served dynamically and on-demand through secured authenticated web sessions, the content distribution systems are effectively authorizing and directing the real-time download of page-based layered content services to a user's connected devices. These devices access the services through time sensitive dedicated URLs which, in one embodiment, only stay valid for a few minutes, all under control of the platform service provider. The browser-based applications are embedded, for example, into HTML5 compliant web browsers which control the fetching, requesting, synchronization, prioritization, normalization and rendering of all available content services.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 3:
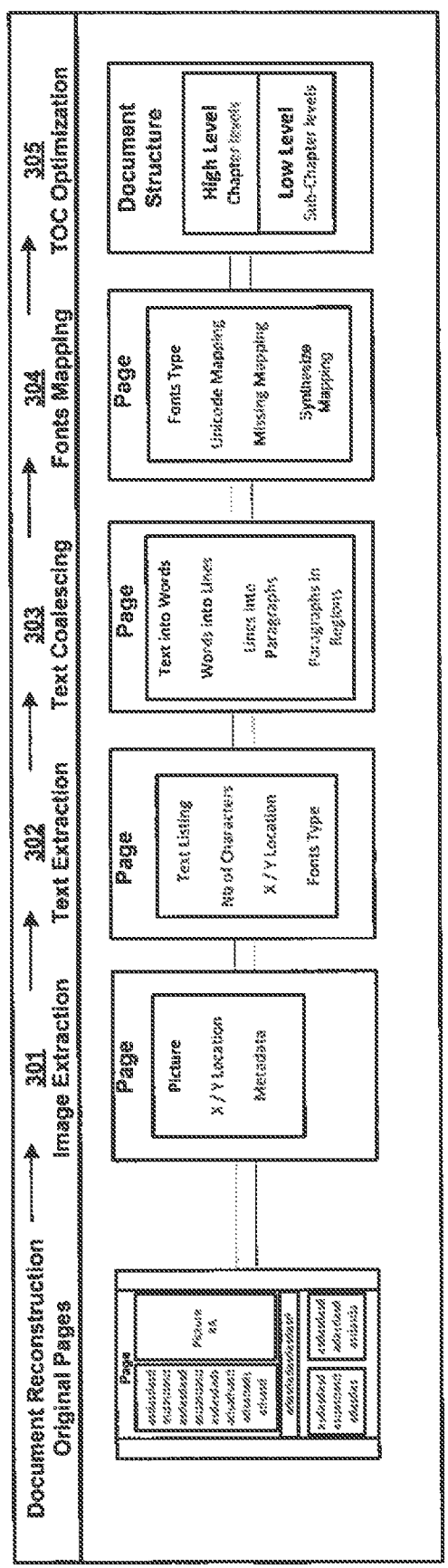
FIG. 3 illustrates a document reconstruction process, according to one embodiment.

FIG. 3 illustrates a process within the publishing system 130 for reconstructing a document. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

During image extraction 301, graphical objects within a page are identified and their respective regions and bounding boxes are determined. For example, a path object in a PDF page may include multiple path construction operators that describe vector graphics made up of lines, rectangles, and curves. Metadata associated with each of the images in the document page is extracted, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The position information of each image may also be determined. The position information of the images can be used to provide page fidelity when rendering the document pages in eReading browser applications, especially for complex documents containing multiple images per page. A caption associated with each image that defines the content of the image may also be extracted by searching for key words, such as "Picture", "Image", and "Tables", from text around the image in the original page. The extracted image metadata for the page may be stored to the overall document metadata and indexed by the page number.

Image extraction 301 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

During text extraction 302, text and embedded fonts are extracted from the original document and the location of the text elements on each page are identified.

Text is extracted from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. Embedded fonts may also be extracted from the original document, which are stored and referenced by client devices for rendering the text content.

The pages in the original document having text are tagged as having text. In one embodiment, all the pages with one or more text objects in the original document are tagged. Alternatively, only the pages without any embedded text are marked.

The output of text extraction 302, therefore, a dataset referenced by the page number, comprising the characters and glyphs in a Unicode character mapping with associated location information and embedded fonts used in the original document.

Text coalescing 303 coalesces the text characters previously extracted. In one embodiment, the extracted text characters are coalesced into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Anal or Courier), font style (e.g., bold or italic), expected spacing between characters based on font type and style, and other graphics state parameters of the pages.

In one embodiment, text coalescence into words is performed based on spacing. The spacing between adjacent characters is analyzed and compared to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

Additionally or alternatively, extracted text characters may be assembled into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the same text is analyzed by both spacing and semantics, so that word grouping results may be verified and enhanced.

Words may be assembled into lines by determining an end point of each line of text. Based on the text direction, the horizontal spacing between words may be computed and averaged. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, lines may be assembled into paragraphs. Based on the text direction, the average vertical spacing between consecutive lines can be computed. The end of the paragraph may have a vertical spacing that is larger than the average. Additionally or alternatively, semantic analysis may be applied to relate syntactic structures of phrases and sentences, so that meaningful paragraphs can be formed.

The identified paragraphs may be assembled into bounding boxes or regions. In one embodiment, the paragraphs may be analyzed based on lexical rules associated with the corresponding language of the text. A semantic analyzer may be executed to identify punctuation at the beginning or end of a paragraph. For example, a paragraph may be expected to end with a period. If the end of a paragraph does not have a period, the paragraph may continue either on a next column or a next page. The syntactic structures of the paragraphs may be analyzed to determine the text flow from one paragraph to the next, and may combine two or more paragraphs based on the syntactic structure. If multiple combinations of the paragraphs are possible, reference may be made to an external lexical database, such as WORD-NET®, to determine which paragraphs are semantically similar.

In fonts mapping 304, in one embodiment, a Unicode character mapping for each glyph in a document to be reconstructed is determined. The mapping ensures that no two glyphs are mapped to a same Unicode character. To achieve this goal, a set of rules is defined and followed, including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, pattern recognition techniques may be applied on the rendered font to identify Unicode characters. If pattern recognition is still unsuccessful, the unrecognized characters may be mapped into the private use area (PUA) of Unicode. In this case, the semantics of the characters are not identified, but the encoding uniqueness is guaranteed. As such, rendering ensures fidelity to the original document.

In table of contents optimization 305, content of the reconstructed document is indexed. In one embodiment, the indexed content is aggregated into a document-specific table of contents that describes the structure of the document at the page level. For example, when converting printed publications into electronic documents with preservation of page fidelity, it may be desirable to keep the digital page numbering consistent with the numbering of the original document pages.

The table of contents may be optimized at different levels of the table. At the primary level, the chapter headings within the original document, such as headings for a preface, chapter numbers, chapter titles, an appendix, and a glossary may be indexed. A chapter heading may be found based on the spacing between chapters. Alternatively, a chapter heading may be found based on the font face, including font type, style, weight, or size. For example, the headings may have a font face that is different from the font face used throughout the rest of the document. After identifying the headings, the number of the page on which each heading is located is retrieved.

At a secondary level, sub-chapter headings within the original document may be identified, such as dedications and acknowledgments, section titles, image captions, and table titles. Vertical spacing between sections, text, and/or font face may be used to segment each chapter. For example, each chapter may be parsed to identify all occurrences of the sub-chapter heading font face, and determine the page number associated with each identified sub-chapter heading.

Education Publishing Platform

Figure 4:
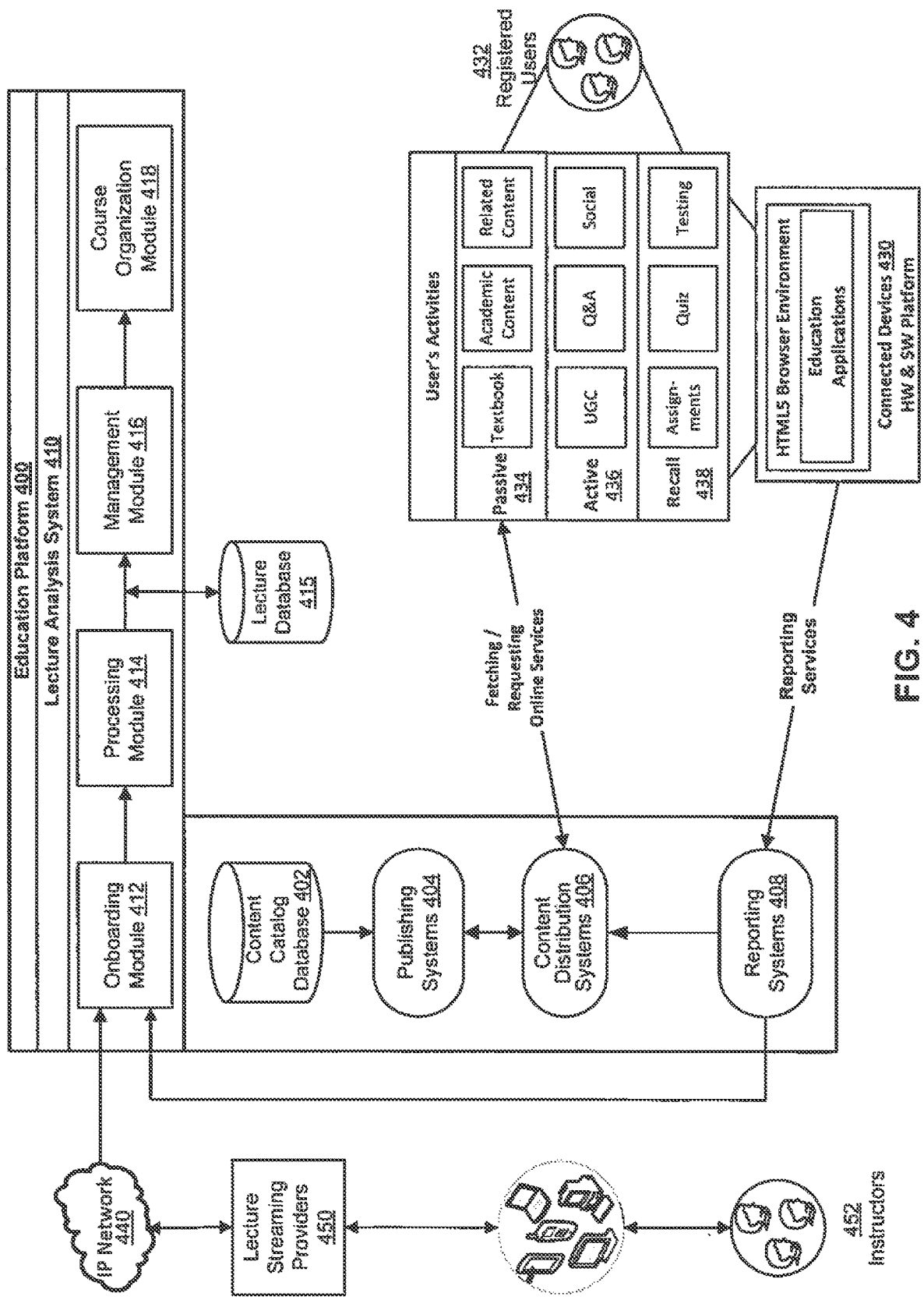
FIG. 4 illustrates an education publishing platform, according to one embodiment.

FIG. 4 illustrates an education publishing platform 400, according to one embodiment. As shown in FIG. 4, the education publishing platform 400 communicates with user devices 430 and one or more lecture streaming providers 450 via a network 440. The education platform 400 may have components in common with the functional blocks of the platform environment 100, and the HTML5 browser environment executing on the user devices 430 may be the same as the eReading application 170 of the experience block 104 of the platform environment 100 or the functionality may be implemented in different systems or modules.

The education platform 400 serves education services to registered users 432 based on a process of requesting and fetching on-line services in the context of authenticated on-line sessions. In the example illustrated in FIG. 4, the education platform 400 includes a content catalog database 402, publishing systems 404, content distribution systems 406, reporting systems 408, and a lecture analysis system 410. The content catalog database 402, which contains the collection of content available via the education platform 402, feeds content to the publishing systems 404. The publishing systems 404 serve the content to registered users 432 via the content distribution system 406. The reporting systems 408 receive reports of user experience and user activities from the connected devices 430 operated by the registered users 432. This feedback is used by the content distribution systems 406 for managing the distribution of the content and for capturing user-generated content and other forms of user activities to add to the content catalog database 402.

Registered users 432 access the content distributed by the content distribution systems 406 via browser-based education applications executing on a user device 430. As users interact with content via the connected devices 430, the reporting systems 408 receive reports about various types of user activities, broadly categorized as passive activities 434, active activities 436, and recall activities 438. Passive activities 434 include registered users' passive interactions with published academic content materials, such as reading a textbook. These activities are defined as "passive" because they are typically orchestrated by each user around multiple online reading authenticated sessions when accessing the structured HTML referenced documents. By directly handling the fetching and requesting of all HTML course-based document pages for its registered users, the connected education platform analyzes the passive reading activities of registered users. For example, the education platform 400 stores a time stamp identifying a time at which a user accessed a page of an electronic document.

Activities are defined as "active" when registered users are interacting with academic documents by creating their own user-generated content layer as managed by the platform services. In contrast to "passive" activities, where content is predetermined and static, the process of creating user generated content is unique to each user, in terms of material, format, frequency, or structure, for example. User-generated content includes asking questions via the education platform 400 when help is needed and answering questions posted by other users, creating personal notes, highlights, and other comments, and interacting with other registered users 432 through the education platform 400 while accessing the referenced HTML documents. These user-generated content activities are authenticated through on-line "active" sessions that are processed and correlated by the platform content distribution system 406 and reporting system 408. In one embodiment, the education platform 400 stores each piece of content created by a user (e.g., a note taken by the user) during an active activity with a time stamp identifying a time at which the user created the content.

Recall activities 438 test registered users against knowledge acquired from their passive and active activities. In some cases, recall activities 438 are used by instructors of educational courses for evaluating the registered users in the course, such as through homework assignments, tests, quizzes, and the like. In other cases, users complete recall activities 438 to study information learned from their passive activities, for example by using flashcards, solving problems provided in a textbook or other course materials, or accessing textbook solutions. In contrast to the passive and active sessions, recall activities can be orchestrated around combined predetermined content material with user-generated content. For example, the assignments, quizzes, and other testing materials associated with a course and its curriculum are typically predefined and offered to registered users as structured documents that are enhanced once personal content is added into them. Typically, a set of predetermined questions, aggregated by the platform 400 into digital testing material, is a structured HTML document that is published either as a stand-alone document or as supplemental to a foundation document. By contrast, the individual answers to these questions are expressed as user-generated content in some testing-like activities. When registered users are answering questions as part of a recall activity, the resulting authenticated on-line sessions are processed and correlated by the platform content distribution 406 and reporting systems 408. Furthermore, the education platform 400 may store a time stamp identifying a time at which a user performed each recall activity.

One or more lecture streaming providers 450 provide recorded lectures to the education platform 400 via the network 440. The lecture streaming providers 450 may include any of a variety of systems storing recorded lectures and providing students with access to the recorded lectures. For example, the lecture streaming providers 450 may include providers of massive open online courses or a university database. Alternatively, lectures may be uploaded directly to the education platform 400 by the instructors 452 who delivered the lectures. In some embodiments, portions of a lecture are uploaded to the education platform 400 rather than an entire lecture. The recorded lectures may include an audio file, a video file, or both. In one embodiment, a recorded lecture uploaded to the education platform 400 is associated with metadata defining properties of the lecture, such as a title, an academic domain, information about a course with which the lecture is associated (e.g., course title, course number, academic institution, and a time lectures in the course are delivered), a description of the lecture, and the name of the instructor providing the lecture. The recorded lecture may also be associated with access rights defining permissions for access to the lecture. For example, a lecture may be accessible to any user of the education platform 400 or the lecture streaming providers 450, any user who has purchased access to the lecture, users associated with a particular educational institution, or users registered for the course associated with the lecture.

The education platform 400 may augment or modify a recorded lecture uploaded via a lecture streaming provider 450. For example, the education platform 400 may transcode a lecture to meet a resolution or bandwidth specification. As another example, the education platform 400 may augment a recorded lecture with an additional track, such as a secondary audio track or a sub-title track. The recorded lectures, including any modification or augmentation, are stored in a lecture database 415 in association with an identifier of a course.

The lecture analysis system 410 of the education platform 400 analyzes lectures accessed by the registered users 432 of the education platform. A lecture, which is typically delivered by an individual knowledgeable about a particular topic, represents a lecturer's unique perspective on a topic. In particular, a lecture represents relative importance the lecturer ascribes to various concepts. Lecturers often emphasize concepts differently depending on the relative importance the lecturer ascribes to the concept, leaving clues throughout the lecture as to the concepts the lecturer believes to be most important. Accordingly, the particular set of concepts discussed in a lecture and the particular emphasis placed on each concept varies from lecture to lecture, even within the same topic. Furthermore, as students often focus on material on which they will be graded in an academic course, students listening to a lecture listen for the clues left by the instructor identifying the concepts the instructor views as important, which are often the concepts that are most important to the course. Students may be more likely to take steps to remember a concept presented during a lecture associated with the course when the students believe the concept to be sufficiently important to the course. Students listening to a lecture may therefore be more likely to complete passive, active, or recall activities at times in a lecture at which the lecturer emphasizes a concept than at times in the lecture at which the lecturer de-emphasizes a concept. The lecture analysis system 410 analyzes a lecture by aggregating events created by the users 432 during a time period corresponding to the lecture and identifies important concepts in the lecture based on the aggregated events. The events may include any of a variety of passive, active, or recall activities performed by the users 432 during a lecture, such as accessing a page of an electronic document, taking a note, or answering a question through the education platform 400.

The lecture analysis system 410 may analyze recorded lectures uploaded to the education platform via the lecture streaming providers 450 and accessed by registered users 432 through the education platform 400. Lectures delivered live to a plurality of users in person and recorded for upload to the education platform 400 may also be analyzed by the lecture analysis system 410 by correlating user activities performed during the live lecture by the users listening to the live lecture to the uploaded recording. Furthermore, the lecture analysis system 410 may analyze lectures that are delivered live and for which a recording is not uploaded to the education platform 400 by analyzing activities of users attending the live lecture in person.

As shown in FIG. 4, one embodiment of the lecture analysis system 410 comprises an onboarding module 412, a processing module 414, a management module 416, and a course organization module 418. Other embodiments of the lecture analysis system 410 may include fewer, different, or additional modules, and the functionality may be distributed differently among the modules.

The onboarding module 412 ingests information describing passive, active, and recall activities completed by the registered users 432 from the reporting systems 408. In one embodiment, the onboarding module 412 receives a time stamp of an activity completed by a user and an identifier of the user from the reporting systems 408. The onboarding module 412 accesses the content catalog database 402 to retrieve information about the activity corresponding to the received time stamp, such as an identifier of the type of activity (e.g., accessing a document or taking a note), a course document associated with the activity, and content generated during the activity (e.g., content of a note taken by the user). The reporting systems 408 may alternatively push the information associated with an activity to the onboarding module 412. For example, when a user generates an event using a user device 430, the onboarding module 412 receives a time stamp of an activity and content generated during the activity from the reporting systems 408. The onboarding module 412 also ingests recorded lectures from the lecture streaming providers 450.

The processing module 414 correlates passive, active, and recall activities to lectures and correlates recorded lectures to courses. To correlate an activity to a recorded lecture or a live-streamed lecture viewed by a user through the education platform 400, the processing module 414 associates the activities completed by the user while the lecture is playing on the user's device with the lecture. To correlate an activity to a lecture attended live by a user (e.g., a lecture for which no recording is uploaded to the education platform 400, or a lecture for which the recording is uploaded after the lecture is attended by one or more users), the processing module 414 may access a course registration of the user. For example, if the user is registered to a course with a lecture scheduled on September 23 from 10 am to 11 am, the processing module 414 correlates the user's activities on the education platform 400 during the scheduled lecture time to a lecture associated with the course. If a recording of the lecture is later uploaded to the education platform 400 with information identifying it as being associated with the course and occurring on September 23 from 10 am to 11 am, the processing module 414 associates the user's activities to the recording of the lecture.

The processing module 414 determines a relative time in the correlated lecture at which an event occurred. For example, if time T0 marks the beginning of a lecture (either the start of a live lecture or the time at which a user started viewing a recorded lecture) and an event occurs at time t, the processing module 414 determines the event to have occurred at time X within the lecture, where X=t−T0.

To correlate a recorded lecture received from a lecture streaming provider 450 to a course, the processing module 414 accesses metadata associated with the lecture and cross-references the metadata with course information stored by the education platform 400. If a recorded lecture has incomplete metadata (e.g., if the metadata does not identify a course title, course number, or institution associated with the course), one embodiment of the processing module 414 analyzes the registered users 432 accessing the recorded lecture. For example, if a majority of the registered users 432 accessing a lecture are associated with a particular educational institution, the processing module 414 determines the lecture to be associated with that institution. As another example, if a majority of the registered users 432 accessing a lecture are registered for a particular course, the processing module 414 determines the lecture to be associated with the course.

The management module 416 aggregates and clusters events created by a plurality of users who viewed or accessed the same lecture. An event represents an activity performed by a user and a time stamp identifying the time at which the user performed the activity. For a lecture delivered live to a plurality of users, the management module 416 may synchronously aggregate the events generated by the plurality of users during the lecture. The management module 416 may also aggregate events associated with the same lecture delivered multiple times. For example, the management module 416 aggregates events generated during the same or a similar lecture delivered to multiple different sections of the same course delivered during different semesters. For a recorded lecture, which is accessed asynchronously by a plurality of users, the management module 416 progressively aggregates the activities completed by the users while the users access the lecture.

In one embodiment, the management module 416 normalizes the aggregated events. For example, if two events are separated by a small time interval (e.g., a few seconds), the management module 416 combines the two events. The time stamp associated with the combined event may be the starting point of the earlier event, or the management module 416 may select a time stamp based on the time stamps of the two events (e.g., selecting a midpoint between the time stamps associated with the two events as the time stamp for the combined event).

The course organization module 418 clusters the events associated with a lecture based on the time stamps of the events. In general, a cluster represents a set of events occurring within close succession of each other that are likely to be associated with the same interval of the lecture. For example, the events in a cluster are likely to be generated in response to the same concept addressed in the lecture. The course organization module 418 may use any of a variety of clustering algorithms to cluster the events, including k-means clustering, density-based clustering methods, and distribution-based clustering methods. In one embodiment, events are clustered based on a determination that events are likely to be generated in a bell curve pattern in response to a portion of the lecture. For example, the times at which users listening to a lecture begin taking a note related to a concept addressed by the lecturer is likely to be a bell curve, where a few users begin taking a note shortly after the instructor addresses the concept, most users begin taking a note a short time later, and a few users begin taking a note still later. In this case, the course organization module 418 clusters a set of events during a lecture that can be approximated by a bell curve.

The course organization module 418 may generate clusters including multiple event types, or the course organization module 418 may filter the events correlated to a lecture prior to clustering. For example, the lecture analysis system 410 filters the events based on a type of the events, generating distinct sets of events for each of passive, active, and recall activities. In this case, the lecture analysis system 410 clusters events associated with users taking notes based on the times the users took the notes, clusters events associated with user accesses of pages of electronic documents based on the times the users accessed the pages, and clusters events associated with users answering questions based on the times the users answered the questions. Alternatively, the course organization module 418 may generate clusters including events associated with two or more types of activities.

The course organization module 418 leverages the aggregated and clustered events to analyze a lecture. In one embodiment, the course organization module 418 uses the clustered events to generate a playlist of clips of a recorded lecture. Each clip corresponds to a cluster of events in the lecture, and includes a portion of the recording of the lecture corresponding to the time stamps associated with the events in the cluster. In another embodiment, based on the clusters of events, the course organization module 418 extracts key indicators from a lecture. A key indicator represents or indicates information emphasized by the lecturer as perceived by the users listening to the lecture. Key indicators may include activities performed by users listening to a lecture that represent the information emphasized by the lecturer, such as a page of a document referenced by the lecturer. The course organization module 418 may additionally or alternatively extract information from the activities performed by users listening to the lecture, such as keywords of user-generated notes or keywords on a document page accessed by the users, as key indicators of the lecture. In one embodiment, the course organization module 418 generates a timeline of a lecture mapping key indicators extracted from the lecture to a respective time in the lecture. The key indicators may also be associated with the clips of the lecture, such that the playlist of the lecture includes one or more clips and identifies key indicators of the lecture corresponding to each clip.

To extract key indicators from a lecture, the course organization module 418 identifies user activities associated with a cluster of events. A cluster of events may include passive, active, or recall activities performed by users who accessed a lecture. In one embodiment, an activity associated with at least a subset of the events in a cluster is extracted as a key indicator of the lecture. For example, if at least a subset of students listening to a lecture accessed a page of an electronic document at a particular time in the lecture, the page accessed by the students is extracted as a key indicator of the lecture. As another example, if at least a subset of users accessing a lecture perform a recall activity at a particular time in the lecture, the recall activity is extracted as a key indicator of the lecture. In another embodiment, activities in a lecture are analyzed to identify keywords associated with the activities, and keywords associated with at least a subset of the events in a cluster are extracted as key indicators of the lecture. For example, the course organization module 418 analyzes notes taken by users at a particular time in the lecture to determine keywords of the notes. A keyword associated with at least a subset of the notes is determined to be a key indicator of the lecture. The subset of activities used to identify and extract key indicators may be defined as a threshold number of activities or a threshold percentage of the activities in a cluster. For example, if at least 75% of the activities in a cluster are users accessing a page of an electronic document, the course organization module 418 extracts the page as a key indicator of the lecture.

To generate a playlist of the lecture, the course organization module 418 generates clips of the recorded lecture. As described above, each event is associated with a time stamp identifying a time at which a user completed an activity. The course organization module 418 uses the time stamps associated with a cluster of events to determine starting and ending points of a clip. In one embodiment, the time stamp associated with an early event in a cluster is used as the starting point of the clip, and the time stamp associated with a later event in the cluster is used as the ending point of the clip. Alternatively, the course organization module 418 may subtract a fixed amount of time from the beginning and/or add a fixed amount of time to the end of the intervals defined by the time stamps associated with the clustered events. For example, if the time stamps associated with a cluster span an interval of 30 seconds, the course organization module 418 may subtract 15 seconds from the beginning and add 15 seconds to the end of the time intervals and thereby define a clip starting 15 seconds before the beginning of the time stamps in a cluster and ending 15 seconds after the end of the time stamps in the cluster. The course organization module 418 may alternatively select a portion of a time interval spanned by the time stamps in a cluster as the time interval for the clip. In another embodiment, the course organization module 418 identifies a median time in a cluster and generates a clip of a fixed amount of time around the median. For example, the course organization module 418 generates a clip from 30 seconds prior to a median time in a cluster to 30 seconds after the median time. In yet another embodiment, the course organization module 418 divides a lecture into clips beginning and ending at midpoints between clusters. For example, if the median time of a first cluster is T1 and the median time of the second cluster is T2, the end time of the clip corresponding to the first cluster and the beginning time of the clip corresponding to the second cluster is T1+(T2−T1)/2.

Figure 5:
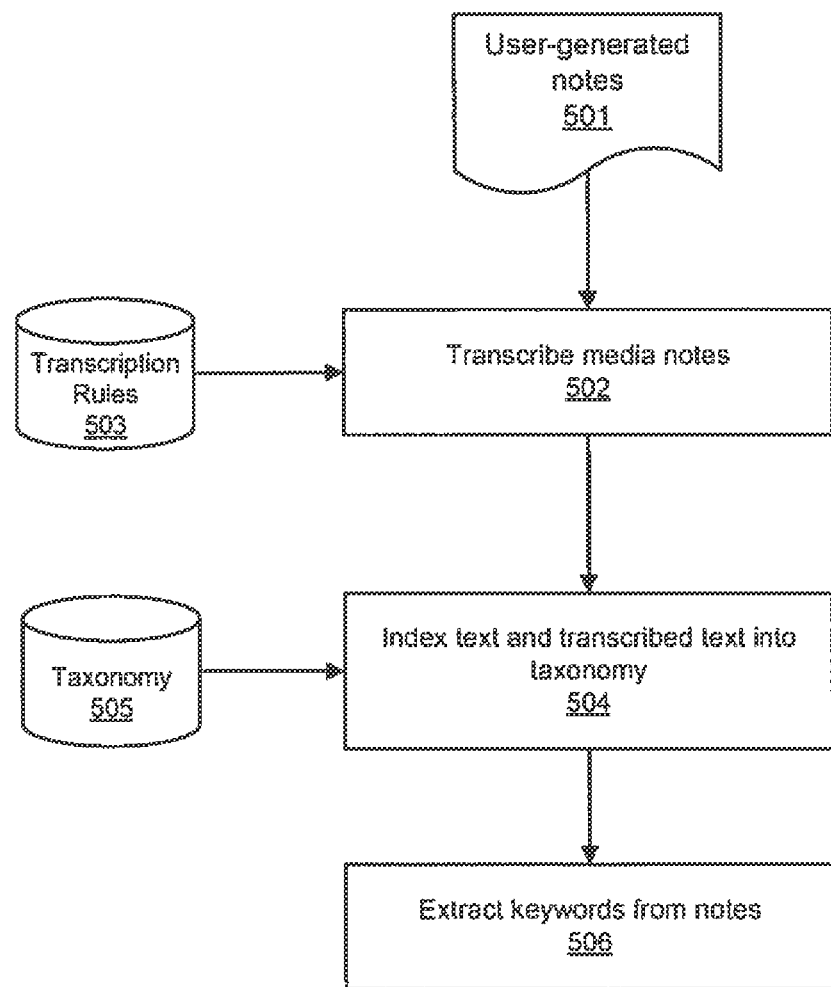
FIG. 5 is a flowchart illustrating a process for extracting key indicators from notes generated by users of the education platform, according to one embodiment.

FIG. 5 is a flowchart illustrating a process for extracting key indicators from notes generated by users of the education platform 400, according to one embodiment. In one embodiment, the process shown in FIG. 5 is performed by the processing module 414 of the lecture analysis system 410. Other embodiments of the process include fewer, additional, or different steps, and may perform the steps in different orders.

The processing module 414 receives user-generated notes 501, which may include textual notes or media notes (such as images, audio recordings, or video recordings). For the media notes, the processing module 414 transcribes 502 the notes into a plain text or HTML format (e.g., by optical character recognition or by a voice-to-text process). The processing module 414 may pre-process the media content to prepare it for transcription. For example, the processing module 414 normalizes images, adjusts image brightness, removes audio background noise, and detects and removes white space from audio recordings. In one embodiment, the processing module 414 transcribes 502 the notes based on a set of transcription rules 503. Example rules for transcribing images include omitting numbering or bullet points appearing in the image, transcribing formulas into text using only keys found on a regular keyboard (e.g., removing superscripts and subscripts), and replacing items that cannot be transcribed (e.g., diagrams, tables, graphs, or formulas that cannot be transcribed with only the keys found on a regular keyboard) with spaces. Example rules for transcribing video or audio include extracting a caption from a video or audio file, transcribing text and formulas contained with the caption, limiting the length of the transcription to a specified portion of the audio (e.g., 30 seconds), disregarding audio files containing multiple voices, removing specified language components (such as verbal fillers or profanity), and flagging non-English notes for manual processing. In another embodiment, the processing module 414 receives a manual transcription of a question or answer from an administrator of the education platform 400.

In one embodiment, the processing module 414 indexes 504 note text, including text originally included in a note generated by a user and text generated by the transcription process, into an academic subject matter taxonomy 505. The subject matter taxonomy 505 organizes content of the education platform 400 into disciplines, subjects within each discipline, and topics within each subject. For example, art, engineering, history, and philosophy, are disciplines in the academic subject matter taxonomy, and mechanical engineering, biomedical engineering, and electrical engineering are subjects within the engineering discipline. Topics within the electrical engineering subject include Kirchoff's voltage law, field effect transistors, and bandpass filters. The subject matter taxonomy 505 may include labels for each of the disciplines and subjects within the taxonomy. To index notes into the subject matter taxonomy, the processing module 414 assigns taxonomic labels to the notes.

The processing module 414 extracts 506 keywords from the notes. The processing module 414 may use any of a variety of algorithms to extract keywords, including term frequency-inverse document frequency analysis of the notes and latent semantic analysis. In one embodiment, the processing module 414 uses the taxonomic labels applied to a note to extract a keyword from the note. For example, the processing module 414 determines a topic in the subject matter taxonomy 505 with which a note is associated, and uses the topic as a keyword of the note.

Lecture Analysis Process

Figure 6:
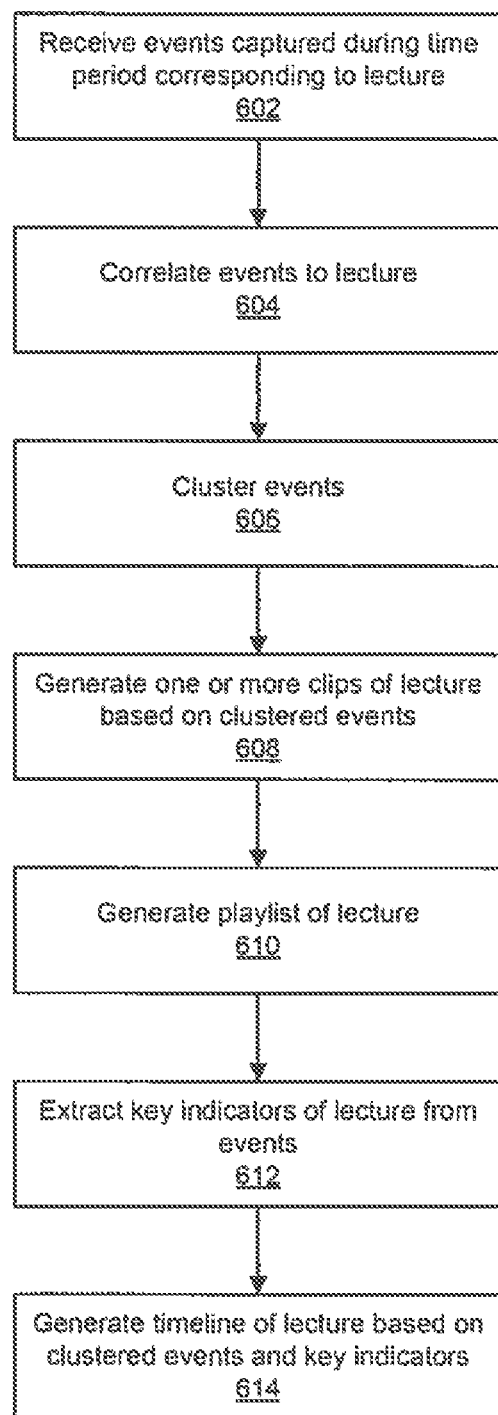
FIG. 6 is a flowchart illustrating a process for generating a playlist of clips of a lecture, according to one embodiment.

FIG. 6 is a flowchart illustrating one embodiment of a process for generating a playlist of clips of a lecture accessed by a plurality of users of an online platform, such as the education platform 400. In one embodiment, the process shown in FIG. 6 is performed by the lecture analysis system 410. Other embodiments of the process include fewer, additional, or different steps, and may perform the steps in different orders.

The lecture analysis system 410 receives 602 events captured during a time period corresponding to a lecture. The events are each associated with a time stamp, which is defined relative to a start time of the lecture, that corresponds to a time at which a user performed an activity. The activities associated with the received events may include any of a variety of passive, active, and recall activities, including accessing a page of an electronic document, taking a note, and answering a question via the education platform 400. Furthermore, the received events may be associated with activities performed by users as the users access a recorded lecture or a live-streamed lecture through the education platform 400, or the events may be associated with activities performed by users attending a live lecture.

The lecture analysis system 410 correlates 604 the received events to a lecture. For events associated with activities performed as users accessed a lecture through the education platform 400, the lecture analysis system 410 correlates 604 the events to a lecture by identifying the lecture accessed by the users and correlating the events associated with activities performed during the accessed lecture to the lecture. For events associated with activities performed as users attended a live lecture, one embodiment of the lecture analysis system 410 correlates the events to the lecture based on course registrations of the users. For example, if a user is registered for a course with lectures occurring Mondays and Wednesdays from 1:15-2:30 pm, the lecture analysis system 410 correlates 604 events associated with activities performed at these times to lectures in the course. The lecture analysis system 410 also correlates the events generated during a live lecture to a time within the lecture. For example, if a user performs an activity at 1:30 pm on Monday, the lecture analysis system 410 generates an event at T=15 minutes into the lecture that started at 1:15 pm on Monday.

The lecture analysis system 410 clusters 606 events correlated to a lecture based on the time stamps associated with the events. If two events occurred in close succession, the lecture analysis system 410 determines the events are related to the same interval of the lecture. The lecture analysis system 410 may use any of a variety of clustering algorithms to cluster 606 the events, including k-means clustering, density-based clustering methods, and distribution-based clustering methods. In one embodiment, the lecture analysis system 410 filters the events correlated to a lecture based on types of activities associated with the events, and clusters the filtered events. In another embodiment, the lecture analysis system 410 clusters the unfiltered set of events correlated to a lecture, generating clusters that may include events associated with multiple types of activities.

When clustering 606 events associated with recorded lectures, which are viewed asynchronously by users of the education platform 400, the lecture analysis system 410 progressively aggregates and clusters the events as they are created. For events associated with live lectures, the lecture analysis system 410 may perform a single clustering operation to cluster the events generated during the lecture. However, in one embodiment, the lecture analysis system 410 aggregates events generated during a live lecture with events generated during a previous delivery of the lecture, such as the lecture delivered by the same instructor during a previous semester. In this case, the lecture analysis system 410 updates the clustering of events associated with the lecture each time the lecture is delivered.

Based on the clustered events, the lecture analysis system 410 generates 608 one or more clips of an audio or video recording of the lecture. To generate the clips, the lecture analysis system 410 selects one or more of the clusters of events associated with a lecture. For example, the lecture analysis system 410 sorts the clusters based on a number of events in each cluster and selects one or more of the highest-ranked clusters. As another example, the lecture analysis system 410 sorts the clusters based on a percentage of the users accessing the lecture who performed activities associated with the events in the cluster and selects one or more of the highest-ranked clusters. Alternatively, the lecture analysis system 410 may select any clusters associated with a lecture containing at least a threshold number of events, containing at least a threshold number of a particular type of event (e.g., events associated with active activities), containing events generated by at least a threshold number of unique users, or containing events generated by at least a threshold percentage of the users who accessed the lecture. In one embodiment, each clip is a portion of a recording of the lecture starting at the time stamp of an early event in a selected cluster. The lecture analysis system 410 may alternatively define the starting and ending times of each clip by subtracting or adding a predefined amount of time to the time interval defined by the time stamps in a cluster or a median time stamp in a cluster.

The lecture analysis system 410 generates 610 a playlist including the clips of the lecture. The playlist may include a list of the clips in the lecture as separate audio or video files, or may be a list of audio bookmarks in the recording of the lecture that enable a user to skip to the clip in the recording. As a cluster of events is likely to be generated when users viewing a lecture perceive a concept addressed in the lecture to be important, the portion of the lecture causing the users to generate the clusters of events are likely to include important concepts of the lecture. By generating clips of the lecture corresponding to the clusters of events and generating a playlist of the clips, the lecture analysis system 410 enables a user to easily access key portions of a lecture without viewing or listening to the entire lecture.

In one embodiment, the lecture analysis system 410 also extracts 612 key indicators of the lecture. One or more key indicators may be extracted from each of the clusters used to generate clips of the lecture, or the lecture analysis system 410 may select different clusters of events during the lecture from which to extract key indicators. The lecture analysis system 410 analyzes the events in each of the selected clusters to identify indicators common to at least a subset of the events in the cluster. For example, the lecture analysis system 410 identifies a page of an electronic document accessed during at least a subset of the events or identifies keywords common to at least a subset of the user-generated notes associated with the cluster. An indicator common to at least a subset of the events in a selected cluster is extracted as a key indicator of the lecture. If multiple indicators are identified from a cluster, the lecture analysis system 410 may extract each of the indicators as a key indicator of the lecture, or may select an indicator associated with the largest number of events in the cluster as the key indicator representing the cluster.

The lecture analysis system 410 generates 614 a timeline of the lecture using the key indicators extracted from the lecture and the time stamps of the events generated during the lecture. The lecture analysis system 410 associates each key indicator with a time in the lecture based on the time stamps of the events in the cluster from which the key indicator was extracted. In one embodiment, the lecture analysis system 410 associates a key indicator with a time interval beginning at the time stamp of an early event in the cluster and ending at the time stamp of a later event in the cluster. In another embodiment, the lecture analysis system 410 selects a point in time with which to associate a key indicator. For example, the lecture analysis system 410 associates a key indicator with a center point of the cluster from which the key indicator was extracted. The lecture analysis system 410 generates a timeline of the lecture that maps each key indicator to the associated time in the lecture.

Figure 7:
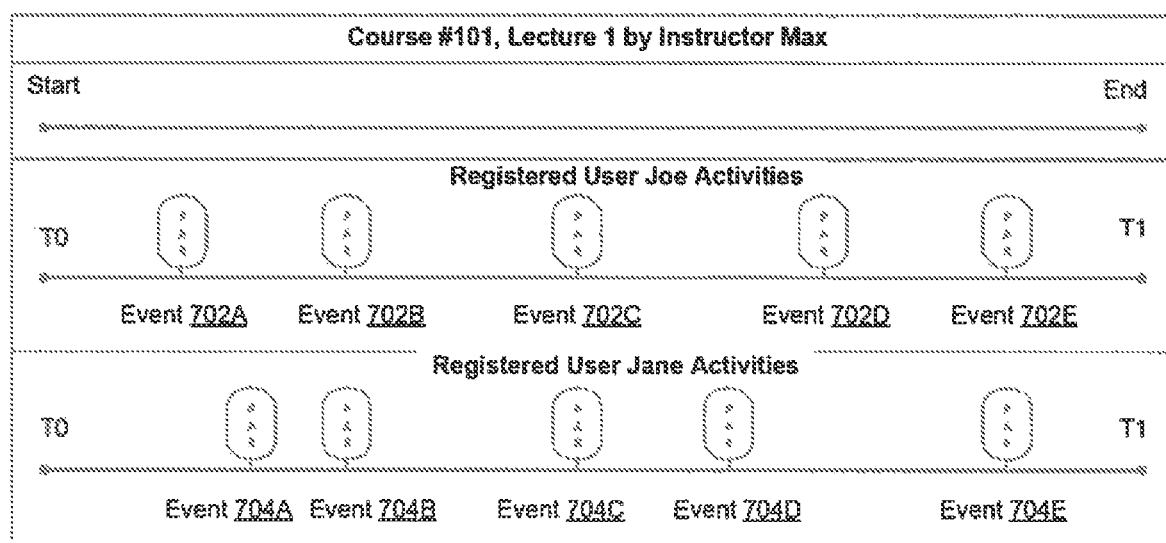
FIG. 7 illustrates example events generated by users during a lecture.

FIGS. 7-10 illustrate examples of the process described with respect to FIG. 6. FIG. 7 illustrates several events 702A-E generated by a user Joe and several events 704A-E generated by a user Jane as Joe and Jane accessed a lecture. As shown in FIG. 7, the events 702 and 704 are each associated with a time in the lecture, which starts at time T0 and ends at time T1. Although events generated by two users are shown in FIG. 7, the lecture analysis systems 410 may receive events generated by any number of users of the education platform 400, and each user may generate any number of events during a lecture.

Figure 8:
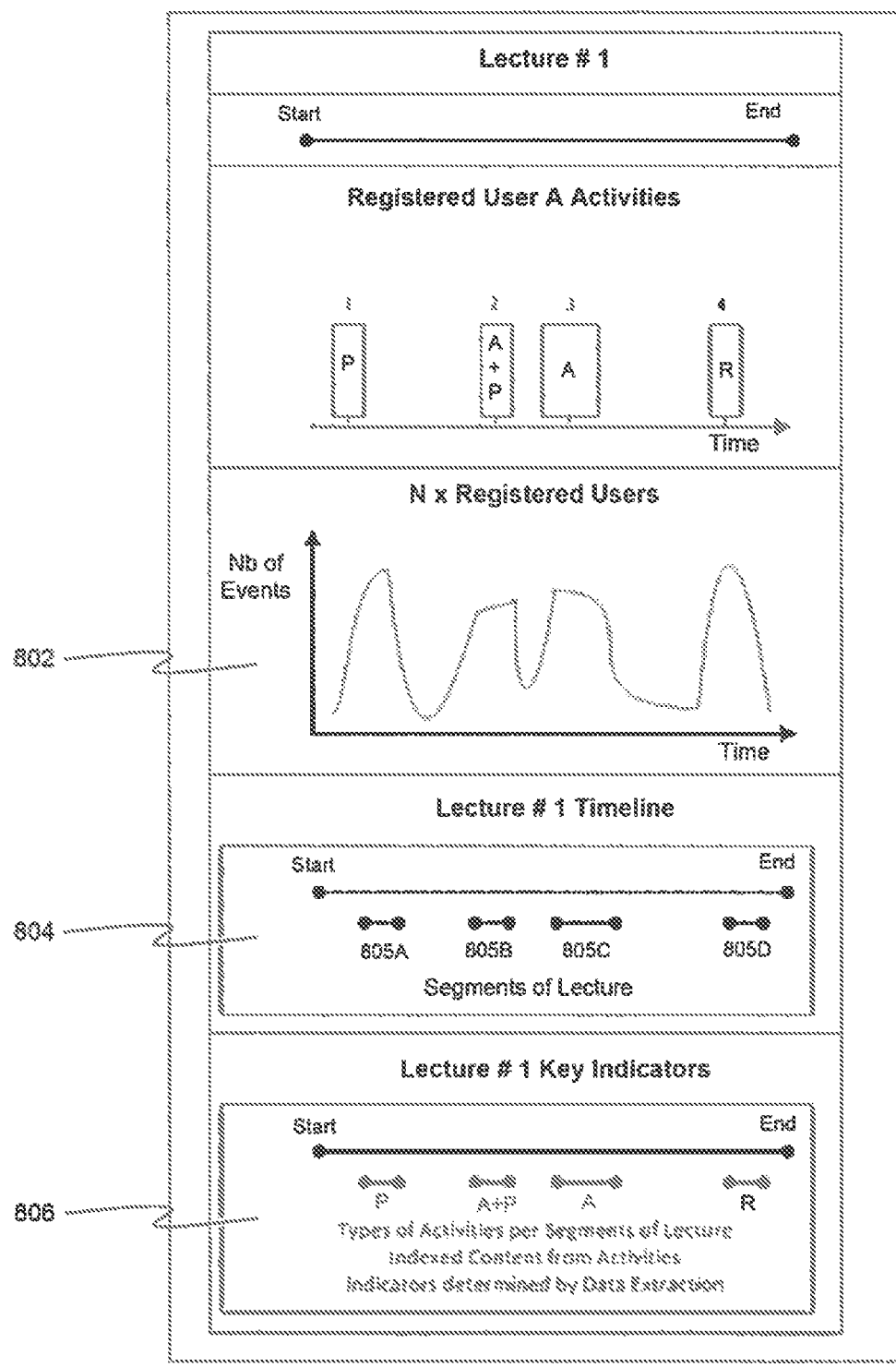
FIG. 8 illustrates an example of aggregated events associated with a lecture and a timeline generated for the lecture.

FIG. 8 illustrates an example of aggregated events associated with a lecture and a timeline generated for the lecture. The plot 802 illustrates an aggregate number of events generated by registered users of the education platform 400 as the users access the lecture. As illustrated by the plot 802, events generated during a lecture may approximately conform to bell curve distributions. The lecture analysis system 410 clusters the events and generates clips of the lecture or extracts key indicators from one or more of the clusters and associates each key indicator with a time or a time interval in the lecture, as described with respect to FIG. 6. The timeline 804 illustrated in FIG. 8 includes several lecture segments 805, which correspond to time stamps of events in four clusters. The key indicators extracted from each cluster are associated with the lecture segments 805, as shown by the timeline 806. The timeline 806 may be displayed to a user of the education platform 400.

Figure 9:
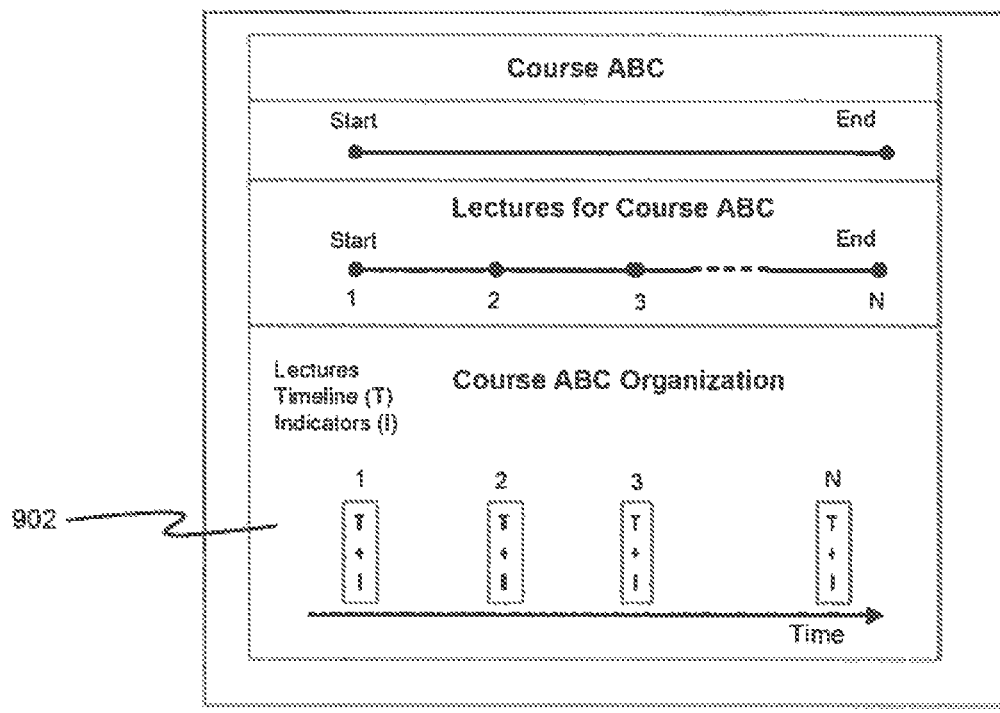
FIG. 9 illustrates an example timeline of a course including multiple lectures.

As a course typically includes multiple lectures, one embodiment of the lecture analysis system 410 generates a timeline of a course as a whole using the key indicators extracted from the lectures in the course. FIG. 9 illustrates a timeline 902 of a course including N lectures. Each of the lectures in the course is associated with a set of key indicators and a timeline of the presentation of the key indicators in the lecture.

Figure 10:
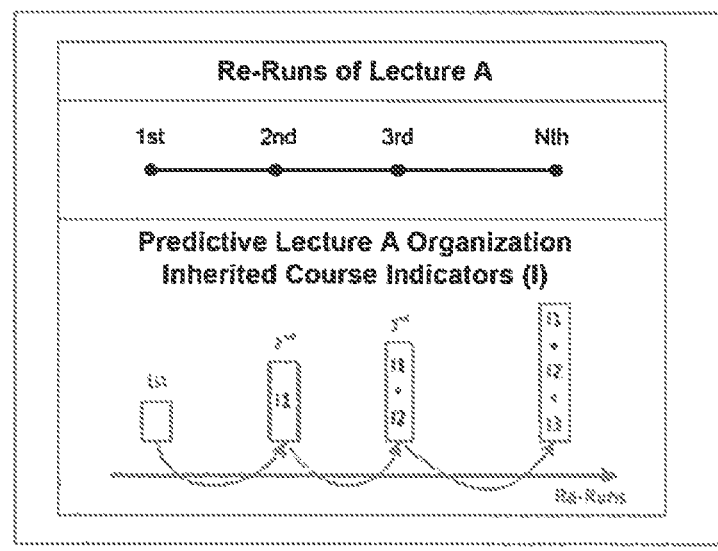
FIG. 10 illustrates an example of progressively aggregating key indicators associated with lecture re-runs.

One embodiment of the lecture analysis system 410 additionally or alternatively aggregates key indicators of a lecture during subsequent deliveries of the lecture. For example, for a lecture repeated N times, the lecture analysis system 410 extracts key indicators from each of the deliveries and aggregates the key indicators. FIG. 10 illustrates an example of aggregating key indicators extracted from re-runs of a lecture. As the lecture analysis system 410 aggregates key indicators over increased numbers of iterations of a lecture, the lecture analysis system 410 develops a robust, increasingly more accurate view of important material in a lecture.

Using the key indicators extracted from lectures in a course or key indicators aggregated from multiple deliveries of a lecture, as shown respectively in FIGS. 9 and 10, a student can gain insight into important components of a lecture or course before attending the lecture or course. For example, a student can use the course timeline 902 to determine whether to enroll in a course. As another example, a student registered for a course can use the course timeline 902 to identify information in the course that is likely to be important, enabling the student to focus attention on studying the important information.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for generating a playlist of clips of a lecture accessed by a plurality of users of an online platform, the method comprising:

at an online platform, providing a recording of the lecture for playback at a plurality of user devices, each user device of the plurality of user devices accessing the online platform;

receiving from each of the plurality of user devices, a plurality of events captured that occurred during the playback of the recording of the lecture at the respective user device, wherein each event of the plurality of events is associated with a time stamp corresponding to a time at which a user of the user device performed a corresponding activity associated with the online platform;

clustering the plurality of events based at least on an activity type associated with the captured events to generate a plurality of clusters of events, wherein the activity type include passive, active, and recall activities;

generating, a plurality of clips of the recording of the lecture based on the plurality of clusters of events, each clip including a portion of the recording of the lecture, the portion beginning and ending at times within the recording identified based on the time stamps associated with one of the plurality of clusters of events; and generating a playlist including the plurality of clips of the lecture.

2. The method of claim 1, wherein generating the plurality of clips of the lecture comprises:

ranking the plurality of clusters of events based on a number of events in each cluster;

selecting one or more of the clusters of events based on the ranking; and generating a clip of the lecture corresponding to each of the selected clusters.

3. The method of claim 1, further comprising:

for each of the plurality of clips, extracting a key indicator of the lecture from the captured events corresponding to the clip; and generating a timeline of the lecture based on the time stamps of the captured events corresponding to the one or more clips, the timeline mapping each extracted key indicator to a time within the lecture.

4. The method of claim 3, wherein generating the timeline of the lecture comprises:

associating each key indicator with a time in the lecture based on the time stamps of the captured events associated with a corresponding clip; and generating the timeline to illustrate the key indicators at the respective associated times in the lecture.

5. The method of claim 1, wherein generating one or more clips of the lecture comprises:

selecting a time in the recording of the lecture for a beginning of the clip based on a time stamp associated with an early event in a cluster of events.

6. The method of claim 1, wherein an activity performed by a user comprises one of accessing a page of an electronic document distributed by the online platform, taking a note via the online platform, and answering a question on the online platform.

7. The method of claim 1, wherein generating one or more clips of the recording of the lecture based on the clustered events comprises:

ranking the clusters based on a number of events in each cluster; and selecting one or more of the highest-ranked clusters.

8. The method of claim 1, wherein generating one or more clips of the recording of the lecture based on the clustered events comprises:

ranking the clusters based on a percentage of the users accessing the lecture who performed activities associated with the events in the cluster; and selecting one or more of the highest-ranked clusters.

9. The method of claim 1, wherein each clip includes a portion of the recording of the lecture beginning and ending at times within the recording, the times determined using the time stamps associated with one of the clusters of events.

10. The method of claim 1, wherein a time stamp associated with an early event in a cluster is used as a beginning time of a clip, and a time stamp associated with a later event in the cluster is used as an ending time of a clip.

11. A non-transitory computer-readable storage medium storing executable computer program instructions for generating a playlist of clips of a lecture accessed by a plurality of users of an online platform, the computer program instructions when executed by a processor causing the processor to:

provide a recording of the lecture for playback at a plurality of user devices, each user device of the plurality of user devices accessing the online platform;

receive from each of the plurality of user devices, a plurality of events captured that occurred during the playback of the recording of the lecture at the respective user device, wherein each event of the plurality of events is associated with a time stamp corresponding to a time at which a user of the user device performed a corresponding activity associated with the online platform;

cluster the plurality of events based at least on an activity type associated with the captured events to generate a plurality of clusters of events, wherein the activity type include passive, active, and recall activities;

generate, a plurality of clips of the recording of the lecture based on the plurality of clusters of events, each clip including a portion of the recording of the lecture, the portion beginning and ending at times within the recording identified based on the time stamps associated with one of the plurality of clusters of events; and generate a playlist including the plurality of clips of the lecture.

12. The non-transitory computer-readable storage medium of claim 10, wherein the computer program instructions causing the processor to generate plurality of clips of the lecture comprise computer program instructions causing the processor to:

rank the plurality of clusters of events based on a number of events in each cluster;

select one or more of the clusters of events based on the ranking; and generate a clip of the lecture corresponding to each of the selected clusters.

13. The non-transitory computer-readable storage medium of claim 11, further comprising computer program instructions for:

for each of the plurality of clips, extracting a key indicator of the lecture from the captured events corresponding to the clip; and generating a timeline of the lecture based on the time stamps of the captured events corresponding to the one or more clips, the timeline mapping each extracted key indicator to a time within the lecture.

14. The non-transitory computer-readable storage medium of claim 13, wherein generating the timeline of the lecture comprises:
associating each key indicator with a time in the lecture based on the time stamps of the captured events associated with a corresponding clip; and
generating the timeline to illustrate the key indicators at the respective associated times in the lecture.

15. The non-transitory computer-readable storage medium of claim 11, wherein generating one or more clips of the lecture comprises:
selecting a time in the recording of the lecture for a beginning of the clip based on a time stamp associated with an early event in a cluster of events.

16. The non-transitory computer-readable storage medium of claim 11, wherein an activity performed by a user comprises one of accessing a page of an electronic document distributed by the online platform, taking a note via the online platform, and answering a question on the online platform.

17. The non-transitory computer-readable storage medium of claim 11, wherein generating one or more clips of the recording of the lecture based on the clustered events comprises:
ranking the clusters based on a number of events in each cluster; and
selecting one or more of the highest-ranked clusters.

18. The non-transitory computer-readable storage medium of claim 11, wherein generating one or more clips of the recording of the lecture based on the clustered events comprises:
ranking the clusters based on a percentage of the users accessing the lecture who performed activities associated with the events in the cluster; and
selecting one or more of the highest-ranked clusters.

19. The non-transitory computer-readable storage medium of claim 11, wherein each clip includes a portion of the recording of the lecture beginning and ending at times within the recording, the times determined using the time stamps associated with one of the clusters of events.

20. The non-transitory computer-readable storage medium of claim 11, wherein a time stamp associated with an early event in a cluster is used as a beginning time of a clip, and a time stamp associated with a later event in the cluster is used as an ending time of a clip.

* * * * *